United States Patent
Ishihara et al.

(10) Patent No.: US 12,202,174 B2
(45) Date of Patent: Jan. 21, 2025

(54) POWDER STORAGE APPARATUS, MELT KNEADER, POWDER STORAGE METHOD, AND PRODUCTION METHOD FOR THERMOPLASTIC RESIN COMPOSITION

(71) Applicant: SUMITOMO CHEMICAL COMPANY, LIMITED, Tokyo (JP)

(72) Inventors: Nozomi Ishihara, Ichihara (JP); Tadashi Fukunaka, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 224 days.

(21) Appl. No.: 17/433,208

(22) PCT Filed: Feb. 25, 2020

(86) PCT No.: PCT/JP2020/007510
§ 371 (c)(1),
(2) Date: Aug. 23, 2021

(87) PCT Pub. No.: WO2020/175484
PCT Pub. Date: Sep. 3, 2020

(65) Prior Publication Data
US 2022/0118652 A1 Apr. 21, 2022

(30) Foreign Application Priority Data
Feb. 26, 2019 (JP) .................. 2019-033379

(51) Int. Cl.
*B29B 7/00* (2006.01)
*B29B 7/42* (2006.01)
(Continued)

(52) U.S. Cl.
CPC .................. *B29B 7/42* (2013.01); *B29B 7/80* (2013.01); *B29C 31/02* (2013.01)

(58) Field of Classification Search
None
See application file for complete search history.

(56) References Cited

FOREIGN PATENT DOCUMENTS

| CN | 101580629 A | 11/2009 | |
|---|---|---|---|
| JP | H-08244026 | * 3/1995 | ............... B29B 7/60 |

(Continued)

OTHER PUBLICATIONS

JPH-08244026 (Koji) Mar. 1995 (online machine translation), [Retrieved on Apr. 10, 2023]. Retrieved from: Espacenet (Year: 1999).*

(Continued)

*Primary Examiner* — Seyed Masoud Malekzadeh
*Assistant Examiner* — Andres E. Behrens, Jr.
(74) *Attorney, Agent, or Firm* — Foley & Lardner LLP

(57) ABSTRACT

A powder storage apparatus 41 includes: a container 42 having a powder inlet 18A, a powder outlet 10A, and a gas outlet 18B; and a tube 70 connected to the powder inlet 18A. If $A_S$ [m²] is a cross-sectional area of a cross section perpendicular to an axis of the tube 70 at a bottom end 70b of the tube 70 and $A_B$ [m²] is a cross-sectional area of the gas outlet 18B, the following expression is satisfied.

$A_S/A_B < 4.$

8 Claims, 1 Drawing Sheet

(51) Int. Cl.
  *B29B 7/80* (2006.01)
  *B29C 31/00* (2006.01)
  *B29C 31/02* (2006.01)

(56) References Cited

FOREIGN PATENT DOCUMENTS

| JP | H-08244026 A | * | 9/1996 | ............... B29B 7/60 |
| JP | H-10180806 A | * | 7/1998 | ............. B29B 7/421 |
| JP | H11-048252 A | | 2/1999 | |
| JP | 2002321220 A | * | 11/2002 | |
| JP | 2002-347073 A | | 12/2002 | |
| JP | 2004-137450 A | | 5/2004 | |
| JP | 2004322473 A | * | 11/2004 | |
| JP | 2005-263468 A | | 9/2005 | |
| JP | 2009-097137 A | | 5/2009 | |
| JP | 2012-076275 A | | 4/2012 | |

OTHER PUBLICATIONS

JPH-08244026-A (Koji) Sep. 1996 (online machine translation), [Retrieved on Jul. 10, 2023]. Retrieved from: Espacenet (Year: 1996).*

JP-2002321220-A (Nomura) Nov. 2002 (online machine translation), [Retrieved on Jul. 10, 2023]. Retrieved from: Espacenet (Year: 2002).*

JPH-10180806-A (Matsumoto) Jul. 1998 (online machine translation), [Retrieved on Jul. 10, 2023]. Retrieved from: Espacenet (Year: 1998).*

JP-2004322473 (Tamaoki) Nov. 2004 (online machine translation), [Retrieved on Dec. 13, 2023]. Retrieved from: Google (Year: 2004).*

Office Action issued in corresponding Chinese Patent Application No. 202080016203.3, dated Feb. 16, 2023.

International Search Report dated May 19, 2020 for corresponding International Patent Application No. PCT/JP2020/007510.

Written Opinion dated May 19, 2020, for corresponding International Patent Application No. PCT/JP2020/007510.

Office Action issued in corresponding Chinese Patent Application No. 202080016203.3, dated Sep. 2, 2022.

International Preliminary Report on Patentability from PCT/JP2020/007510 Dtd Sep. 10, 2021 (5 pages).

Office Action issued in corresponding Japanese Patent Application No. 2021-502277 dated Oct. 31, 2023 (5 pages).

Office Action issued in corresponding Chinese Patent Application No. 202080016203.3, dated Jun. 25, 2023.

Notification of a Third-Party Submission, dated Aug. 31, 2023, issued in corresponding Japanese Patent Application No. 2021-502277.

Office Action, dated Jun. 27, 2023, issued in corresponding Japanese Patent Application No. 2021-502277 (4 pages).

Kubota Corporation, "Gravimetric Feeder", Feb. 2, 2019, pp. 1-33.

Toyo Hitec Co., Ltd., "Air release", Oct. 7, 2024, vol. 14, Retrieved from the Internet: https://www.toyohi.co.jp/kona-topi/detail/16, pp. 1-10.

Toyo Hitec Co., Ltd., "Screw Feeder with Hopper", Oct. 7, 2024, Retrieved from the Internet: https://www.toyohitec.com/product/detail/59RROOO159?kind_id=1, pp. 1-10.

* cited by examiner

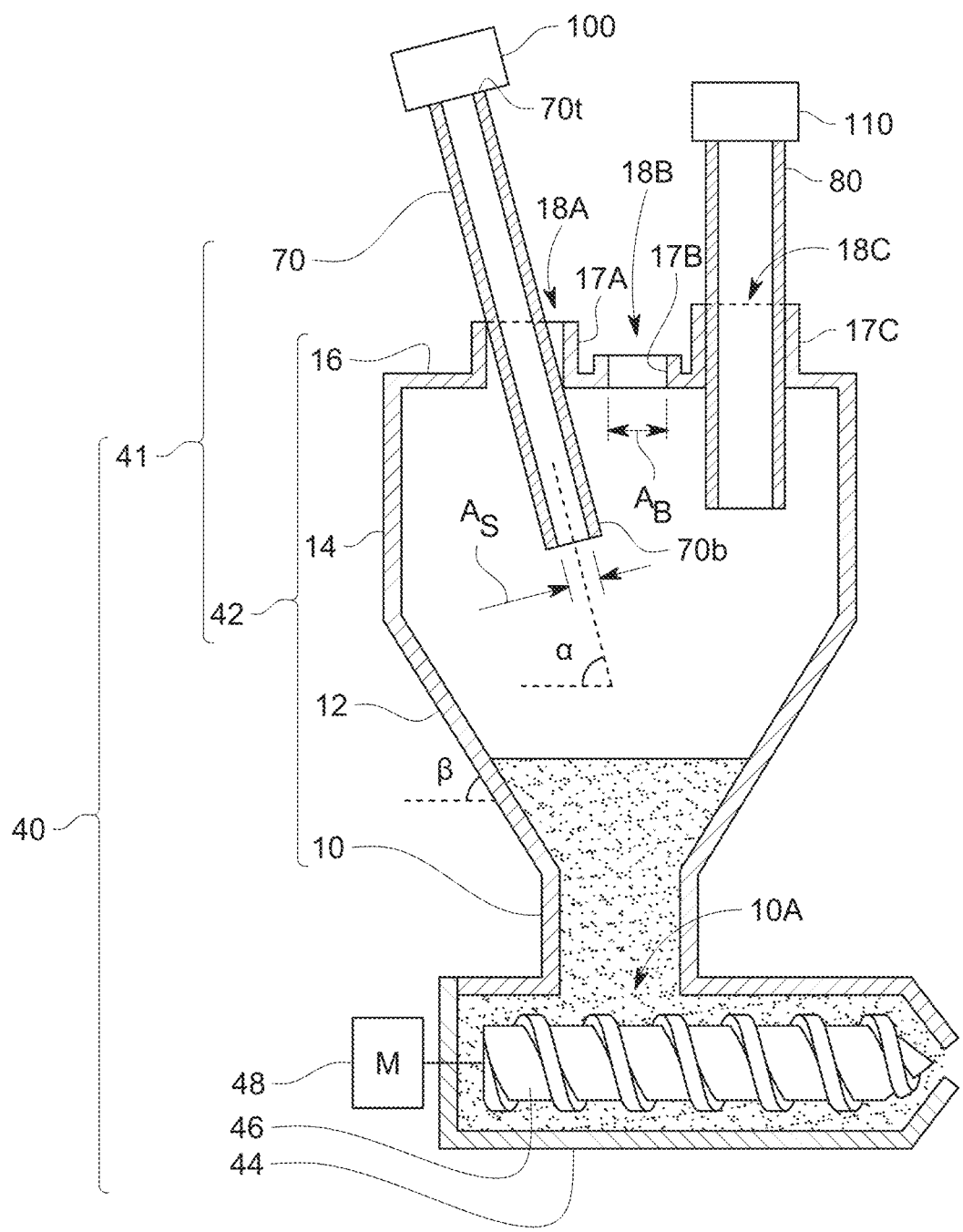

POWDER STORAGE APPARATUS, MELT KNEADER, POWDER STORAGE METHOD, AND PRODUCTION METHOD FOR THERMOPLASTIC RESIN COMPOSITION

CROSS-REFERENCE TO RELATED APPLICATIONS

The present application claims priority under 37 U.S.C. § 371 to International Patent Application No. PCT/JP2020/007510, filed Feb. 25, 2020, which claims priority to and the benefit of Japanese Patent Application No. 2019-033379, filed on Feb. 26, 2019. The contents of these applications are hereby incorporated by reference in their entireties.

TECHNICAL FIELD

The present invention relates to, for example, a method for suppressing a powder raw material scattering from an exhaust hole of a container when the powder raw material is supplied to the container such as a hopper while being caused to flow down within a tube.

BACKGROUND ART

In the related art, supplying powder to an object such as a hopper of a melt kneader while causing the powder to flow down within a tube is known as exemplified in Patent Literature 1 and Patent Literature 2.

CITATION LIST

Patent Literature

Patent Literature 1: Japanese Unexamined Patent Application Publication No. 2004-322473
Patent Literature 2: Japanese Unexamined Patent Application Publication No. 2012-76275

SUMMARY OF INVENTION

Technical Problem

When the powder is supplied to the container while being caused to flow down within the tube, a gas such as air is also supplied to the container via the tube along with the supplied powder. The container is provided with a gas outlet for allowing the inflow gas to escape. When the flow rate of the accompanying gas is excessive, the powder flies up in the container and is discharged from the gas outlet.

The present invention has been made in view of the above problem, and an object of the present invention is to suppress powder scattering from a gas outlet when the powder is supplied to a container while being caused to flow down within a tube.

Solution to Problem

A powder storage apparatus according to the present invention includes: a container having a powder inlet, a powder outlet, and a gas outlet; and a tube connected to the powder inlet. Here, if $A_S$ [m²] is a cross-sectional area of a cross section perpendicular to an axis of the tube at a bottom end of the tube and $A_B$ [m²] is a cross-sectional area of the gas outlet, the following expression is satisfied.

$$A_S/A_B < 4$$

Here, in the powder storage apparatus, an angle formed by a horizontal plane and the axis of the tube can be 40 to 90°.

In addition, at least a part of the bottom end of the tube can be positioned at the same height as the powder inlet of the container or below the powder inlet.

A powder storage method according to the present invention is a powder storage method using the powder storage apparatus, the method including:
a step of causing a powder supplied from a top end of the tube to flow down within the tube to be supplied into the container from the bottom end of the tube.

Here, in the method, if a supply flow rate of the powder supplied into the container via the tube is M [kg/s], a bulk density of the powder is $\rho_p'$ [kg/m³], and a terminal velocity of the powder is $U_r$ [m/s], the following expression can be further satisfied.

$$A_S > (M/(\rho_p' U_r))$$

A melt kneader according to the present invention includes: the powder storage apparatus; a cylinder connected to the powder outlet; and a screw provided in the cylinder.

A method according to the present invention is a production method for a thermoplastic resin composition using the melt kneader, the method including:
a step of supplying thermoplastic resin powder into the container from the bottom end of the tube by supplying the thermoplastic resin powder from the top end of the tube and causing the thermoplastic resin powder to flow down within the tube;
a step of supplying additive powder to the container;
a step of supplying the thermoplastic resin powder and the additive powder in the container into the cylinder from the powder outlet; and
a step of melting and kneading the thermoplastic resin powder and the additive powder with the screw to obtain the thermoplastic resin composition.

Advantageous Effects of Invention

According to the present invention, powder scattering can be suppressed when the powder is stored in the container.

BRIEF DESCRIPTION OF DRAWINGS

The FIGURE is a schematic cross-sectional view of the powder storage apparatus and the melt kneader according to an embodiment of the present invention.

DESCRIPTION OF EMBODIMENTS

An embodiment of the present invention will be described with reference to the FIGURE.

The FIGURE is a cross-sectional view of a powder storage apparatus 41 and a melt kneader 40 used in the present embodiment.

The melt kneader 40 mainly includes the powder storage apparatus 41, a cylinder 44, a screw 46, and a motor 48.

The screw 46 is provided in the cylinder 44, and the motor 48 rotates the cylinder.

The powder storage apparatus 41 has a tube 70 and a hopper (container) 42.

The hopper 42 has a connecting pipe 10, a cone portion 12, a body portion 14, and a top plate 16. The top plate 16 may not be provided. The cone portion 12 has a shape in which its internal cross-sectional area decreases toward its lower side. A conical shape and an eccentric conical shape are examples of the shape of the cone portion 12.

The connecting pipe 10 connects the bottom end opening of the cone portion 12 and the cylinder 44 of the melt kneader 40. The connecting pipe 10 may not be provided, and the bottom end opening of the cone portion 12 and the cylinder 44 of the melt kneader 40 may be directly connected.

The body portion 14 is a pipe having a constant internal cross-sectional area over the top and bottom and is connected to the top end opening of the cone portion 12. The horizontal cross-sectional shape of the body portion 14 is not particularly limited and can be a round shape and polygons such as a quadrangle.

The top plate 16 closes the top end opening of the body portion 14. The top plate 16 is provided with a first powder inlet 18A, a gas outlet 18B, and a second powder inlet 18C by tube members 17A, 17B, and 17C, respectively. The first powder inlet 18A is an opening for supplying a first powder via the tube 70. The gas outlet 18B is an opening for discharging a gas accompanied by the tube 70 or the like and supplied into the hopper 42. The second powder inlet 18C is an opening for supplying a second powder as needed. The opening at the bottom end of the connecting pipe 10 is a powder outlet 10A. In a case where the top plate 16 is not provided, the entire part of the top end cross section of the body portion 14 excluding the cross section of the powder input tube is the gas outlet.

The material of the hopper 42 is not particularly limited, and steel, stainless steel, and so on can be used. An angle $\beta$ formed by a horizontal plane and the slope of the cone portion 12 may be larger than the angle of repose of the powder raw material. Specifically, $\beta$ is preferably 40 to 90°.

The tube 70 has openings at a top end 70t and a bottom end 70b, respectively. The bottom end 70b of the tube 70 is connected to the first powder inlet 18A. Specifically, at least a part of the bottom end 70b is disposed so as to be positioned at the same height as the first powder inlet (powder inlet) 18A or below the first powder inlet 18A. Preferably, the entire bottom end 70b of the tube 70 is disposed so as to be positioned at the same height as the first powder inlet 18A or below the first powder inlet 18A. In the most preferable aspect, the entire bottom end 70b of the tube 70 is disposed so as to be positioned below the first powder inlet 18A, that is, the entire bottom end 70b is inserted in the hopper 42. Meanwhile, the top end 70t of the tube 70 is disposed outside the hopper 42. An angle $\alpha$ formed by a horizontal plane and the axis of the tube 70 may be larger than the angle of repose of the powder and can be, for example, 40 to 90°. The material of the tube 70 is not limited, and a metal material such as steel and stainless steel and a resin material such as vinyl chloride are examples of the material. It is preferable to provide an airtight member between the tube 70 and the tube member 17A to eliminate a gap through which gas flows.

A first powder feeder 100 is connected to the top end 70t of the tube 70. A known powder transfer device such as a screw feeder is an example of the feeder 100.

In the present embodiment, if $A_S$ [m$^2$] is the cross-sectional area of the cross section perpendicular to the axis of the tube 70 at the bottom end 70b of the tube 70 and $A_B$ [m$^2$] is the cross-sectional area of the gas outlet 18B, the following expression is satisfied.

$$A_S/A_B < 4 \quad (A)$$

$A_S/A_B \leq 2.0$ is preferable, $A_S/A_B \leq 1.0$ is more preferable, $A_S/A_B \leq 0.3$ is further preferable, and $A_S/A_B \leq 0.2$ is particularly preferable.

$A_S/A_B$ is greater than 0. $0.02 < A_S/A_B$ is preferable.

The second powder inlet 18C is connected to a second powder feeder 110 by a tube 80. In the present embodiment, the bottom end of the tube 80 is inserted in the hopper 42 and, as in the case of the tube 70, it is preferable to provide an airtight member between the tube 80 and the tube member 17C to eliminate a gap through which gas flows.

(Powder Storage Method and Thermoplastic Resin Composition Production Method)

First, using the feeder 100, the first powder is quantitatively supplied into the tube from the top end 70t of the tube 70. Then, the first powder supplied from the top end 70t of the tube 70 is caused to flow down within the tube 70 and be discharged from the bottom end 70b of the tube 70. The powder is supplied into the hopper (container) 42 as a result.

The type of the supplied first powder is not particularly limited. Thermoplastic resin powder such as polypropylene, polyethylene, polystyrene, and polyvinyl chloride; ceramic powder such as alumina and silica; and metal powder such as aluminum and iron are examples of the powder.

Although the average particle diameter of the first powder is not particularly limited, 1.5 mm or less is highly effective. The average particle diameter can be D50 in a weight-based particle size distribution measured by the sieving method. It should be noted that application to a raw material with an agglomerated particle diameter of 1.5 mm or less is highly effective in the case of agglomerated particles.

Although the particle density of the powder is not particularly limited, 0.2 g/cm$^3$ or more is highly effective.

A case where a supply flow rate M of the powder supplied via the tube 70 is 1 kg/hr or more is highly effective because the flow rate of the accompanying gas increases in that case.

Here, it is preferable that the following expression is further satisfied if the supply flow rate of the first powder supplied via the tube is M [kg/s], the bulk density of the first powder is $\rho_p'$ [kg/m$^3$], and the terminal velocity of the first powder is $U_r$ [m/s].

$$A_S > (M/(\rho_p' U_r)) \quad (B)$$

As a result, the powder flowing down within the tube 70 is unlikely to be clogged.

Here, the terminal velocity $U_r$ of the first powder can be calculated using the terminal velocity equation in the Allen region of the following expression.

$$U_r = \{(4/225) \times ((\rho_p - \rho_f)^2 g^2)/(\rho_f \mu_f)\}^{1/3} Dp$$

Dp: average particle diameter of first powder [m]
$\rho_f$: density of accompanying gas [kg/m$^3$]
$\mu_f$: viscosity of accompanying gas [Pa·s]

Subsequently, the second powder is supplied via the second powder inlet 18C as needed. Additives such as antioxidants, ultraviolet absorbers, pigments, antistatic agents, copper damage inhibitors, flame retardants, neutralizers, foaming agents, plasticizers, nucleating agents, bubble inhibitors, and cross-linking agents are examples of the second powder used during thermoplastic resin composition production.

Further, usually, the supply flow rate of the second powder is sufficiently smaller than the supply flow rate of the first powder. For example, the supply flow rate of the second powder is 1/10 or less or 1/20 or less of the supply flow rate of the first powder. Accordingly, the flow rate of the gas accompanying the supply of the additive powder from the tube 80 for the second powder is at a level that can be almost negligible as compared with the amount of the gas accompanying the first powder. It should be noted that the second powder inlet 18C can be closed in a case where the second powder is not supplied.

The average particle diameter and the particle density of the second powder can be the same as those of the first powder. The first powder and the second powder are supplied at the same time.

During or after the powder supply, the screw 46 is rotated to supply the powder mixture in the hopper 42 into the cylinder 44 via the connecting pipe (powder outlet) 10. Then, the screw 46 melts and kneads the mixture and a thermoplastic resin composition is obtained as a result.

According to the present embodiment, $A_S/A_B$ satisfies the above relationship. Accordingly, when the first powder is supplied into the hopper 42 via the tube 70, the powder is unlikely to scatter from the gas outlet 18B and be lost from the inside of the hopper 42.

In particular, in a case where the particle diameter of the first powder is small (for example, 300 μm or less in average particle diameter) or in a case where the second powder is supplied with a small particle diameter (for example, 300 μm or less in average particle diameter) with the first powder having a large particle diameter, particles are likely to scatter from the gas outlet 18B and the present embodiment is highly effective. According to the present embodiment, the powder raw material can be used as a raw material for a thermoplastic resin composition without loss, which is efficient. According to the present embodiment, a composition-controlled plastic resin composition can be obtained in a case where a plurality of powders are supplied to the hopper 42 and mixed. In other words, the ratio of the flow rates at which the first powder and the second powder are supplied to the hopper 42 and the compounding ratio of the first powder and the second powder in the obtained thermoplastic resin composition can be substantially equal to each other.

In a case where the second powder is not used, the range of the average particle diameter of the first powder is preferably 50 to 1000 μm. In a case where the second powder is used, the range of the average particle diameter of at least one of the first powder and the second powder can be 50 to 1000 μm. The average particle diameter in this case is an agglomerated particle diameter in the case of agglomerated particles. The average particle diameter can be D50 in a weight-based particle size distribution measured by the sieving method.

The preferable range of the particle density (in the case of agglomerated particles, the apparent density of the agglomerated particles) corresponding to the above preferable particle diameter range is 0.1 g/cm³ or more.

The present invention is not limited to the above embodiment and can be implemented in various modifications.

The form of the hopper is not particularly limited, and any shape may be used insofar as powder can be stored and supplied to the outside. For example, the hopper may lack the body portion and may lack the second powder inlet 18C.

The target for powder supply from the powder storage apparatus 41 is not limited to the cylinder of the melt kneader and may be a device such as a stirring tank.

In addition, although the cross-sectional area of the cross section perpendicular to the axis of the tube 70 is preferably constant in the axial direction, the implementation is possible even when the cross-sectional area is not constant in the axial direction, for example, even in a tapered shape.

EXAMPLES

Aluminum hoppers 42 having a plurality of body diameters were prepared (α=10 to 30°), cylindrical straight pipe-shaped tubes 70 made of vinyl chloride resin and having a plurality of diameters (β=60°). The hopper-tube combination in each example and comparative example is as shown in Table 1. Table 1 shows the cross-sectional area $A_S$ of the tube 70, a diameter DB and the cross-sectional area $A_B$ of the gas outlet 18B, and $A_S/A_B$.

Using a screw feeder manufactured by KUMA engineering Co., Ltd., the first powder was supplied at the constant supply flow rate M from the top end 70t of the tube 70. Polypropylene powder (average particle diameter 750 μm, density 950 kg/m³, bulk density 450 kg/m³) and activated alumina (average particle diameter 3 mm, density 1600 kg/m³, bulk density 860 kg/m') were used as the first powder. In parallel with the supply of the first powder, a clearing agent (agglomerated particle diameter 270 μm, bulk density 200 kg/m³) as the second powder was supplied at a supply flow rate M2 from the second powder inlet 18C into the hopper 42. The gas inflow and outflow from the gap between the tube 70 and the tube member 17A at the first powder inlet 18A and the gap between the tube 80 and the tube member 17C at the second powder inlet 18C were made substantially zero by an airtight member.

Subsequently, the screw was turned to melt and knead the powder mixture in the hopper 42 in the cylinder 44 and obtain a thermoplastic resin composition.

The thermoplastic resin composition was analyzed, and the ratio of the mass concentration of the additive in the thermoplastic resin composition to the mass concentration of the second powder in the total powder supplied into the hopper 42 was obtained as an additive passage rate. The results are shown in Table 1.

TABLE 1

| | Hopper body diameter [mm] | Tube 70 Cross-sectional shape | Tube 70 Cross-sectional area $A_S$ [m²] | Diameter of gas outlet 18B $D_B$ [mm] | Cross-sectional area of gas outlet 18B $A_B$ [m²] | $A_S/A_B$ [—] | First powder | First powder supply flow rate M [kg/s] | M/($\rho_p' U_r$) [m²] | Additive supply flow rate M2 [kg/s] | Additive passage rate [wt %] |
|---|---|---|---|---|---|---|---|---|---|---|---|
| Example 1 | 400 | Diameter 9 mm circle | 6.4E−05 | 56 | 2.5E−03 | 2.60E−02 | Polypropylene | 8.30E−03 | 6.40E−06 | 3.60E−05 | 100 |
| Example 2 | 400 | Diameter 15 mm circle | 1.8E−04 | 56 | 2.5E−03 | 7.31E−02 | Polypropylene | 8.90E−03 | 6.40E−06 | 3.60E−05 | 93 |
| Example 3 | 400 | Diameter 54 mm circle | 2.3E−03 | 110 | 9.5E−03 | 2.42E−01 | Activated alumina | 2.20E−03 | 3.27E−06 | 5.60E−05 | 97 |
| Example 4 | 250 | Diameter 45 mm circle | 1.6E−03 | 40 | 1.3E−03 | 1.27 | Polypropylene | 3.30E−03 | 2.40E−06 | 1.30E−05 | 51.1 |

TABLE 1-continued

|  | Hopper body diameter [mm] | Tube 70 | | Diameter of gas outlet 18B $D_B$ [mm] | Cross-sectional area of gas outlet 18B $A_B$ [m²] | $A_S/A_B$ [—] | First powder | First powder supply flow rate M [kg/s] | $M/(\rho_p'U_r)$ [m²] | Additive supply flow rate M2 [kg/s] | Additive passage rate [wt %] |
|---|---|---|---|---|---|---|---|---|---|---|---|
|  |  | Cross-sectional shape | Cross-sectional area $A_S$ [m²] |  |  |  |  |  |  |  |  |
| Comparative Example 1 | 250 | Diameter 82 mm circle | 5.3E−03 | 40 | 1.3E−03 | 4.22 | Polypropylene | 3.30E−03 | 2.40E−06 | 1.30E−05 | 43 |
| Comparative Example 2 | 1000 | 240 × 420 mm rectangle | 1.0E−01 | 140 | 1.5E−02 | 6.50 | Polypropylene | 5.60E−02 | 4.00E−05 | 2.20E−04 | 39 |

In the example, the scatter was suppressed as compared with the comparative example.

REFERENCE SIGNS LIST

18A: first powder inlet, 10A: powder outlet, 18B: gas outlet, 42: hopper (container), 70: tube, 41: powder storage apparatus, 40: melt kneader, 44: cylinder, 46: screw.

The invention claimed is:

1. A powder storage apparatus comprising: a container having a powder inlet, a powder outlet, and a gas outlet; and a tube connected to the powder inlet, wherein $A_s$ is a cross-sectional area of a cross section perpendicular to an axis of the tube at a bottom end of the tube, $A_B$ is a cross-sectional area of the gas outlet, and $A_s/A_B<0.3$.

2. The powder storage apparatus according to claim 1, wherein an angle formed by a horizontal plane and the axis of the tube is 40 to 90°.

3. The powder storage apparatus according to claim 1, wherein at least a part of the bottom end of the tube is positioned at the same height as the powder inlet of the container or below the powder inlet.

4. A powder storage method using the powder storage apparatus according to claim 1, the method comprising:
   a step of causing a powder supplied from a top end of the tube to flow down within the tube to be supplied into the container from the bottom end of the tube.

5. The powder storage method according to claim 4, wherein if a supply flow rate of the powder supplied into the container via the tube is M [kg/s], a bulk density of the powder is $\rho_p'$ [kg/m³], and a terminal velocity of the powder is $U_r$ [m/s], the following expression is further satisfied $$A_S>(M/(\rho_p'U_r)).$$

6. A melt kneader comprising:
   the powder storage apparatus according to claim 1;
   a cylinder connected to the powder outlet; and
   a screw provided in the cylinder.

7. A production method for a thermoplastic resin composition using the melt kneader according to claim 6, the method comprising:
   a step of supplying thermoplastic resin powder into the container from the bottom end of the tube by supplying the thermoplastic resin powder from the top end of the tube and causing the thermoplastic resin powder to flow down within the tube;
   a step of supplying additive powder to the container;
   a step of supplying the thermoplastic resin powder and the additive powder in the container into the cylinder from the powder outlet; and
   a step of melting and kneading the thermoplastic resin powder and the additive powder with the screw to obtain the thermoplastic resin composition.

8. The powder storage apparatus according to claim 2, wherein at least a part of the bottom end of the tube is positioned at the same height as the powder inlet of the container or below the powder inlet.

* * * * *